United States Patent
Tanaka

(10) Patent No.: US 9,417,391 B2
(45) Date of Patent: Aug. 16, 2016

(54) OPTICAL COMBINER AND LASER DEVICE USING THE SAME

(71) Applicant: FUJIKURA LTD., Tokyo (JP)

(72) Inventor: Hironori Tanaka, Sakura (JP)

(73) Assignee: FUJIKURA LTD., Tokyo (JP)

( * ) Notice: Subject to any disclaimer, the term of this patent is extended or adjusted under 35 U.S.C. 154(b) by 0 days.

(21) Appl. No.: 14/462,656

(22) Filed: Aug. 19, 2014

(65) Prior Publication Data

US 2015/0055916 A1    Feb. 26, 2015

(30) Foreign Application Priority Data

Aug. 22, 2013    (JP) ................................. 2013-172179

(51) Int. Cl.
| | |
|---|---|
| G02B 6/26 | (2006.01) |
| G02B 6/42 | (2006.01) |
| G02B 6/04 | (2006.01) |
| G02B 6/06 | (2006.01) |
| G02B 6/28 | (2006.01) |
| F21V 8/00 | (2006.01) |
| G02B 6/12 | (2006.01) |

(52) U.S. Cl.
CPC ............ *G02B 6/2856* (2013.01); *G02B 6/0028* (2013.01); *G02B 6/0048* (2013.01); *G02B 6/12016* (2013.01); *G02B 6/262* (2013.01)

(58) Field of Classification Search
CPC .. G02B 6/02042; G02B 6/028; G02B 6/0288; G02B 6/0281; G02B 6/0283; G02B 6/0285; G02B 6/0286
USPC ............. 385/15, 43, 115–117, 123–128, 141, 385/142, 144
See application file for complete search history.

(56) References Cited

U.S. PATENT DOCUMENTS

| | | | |
|---|---|---|---|
| 2007/0280597 A1 | 12/2007 | Nakai et al. | |
| 2009/0154879 A1* | 6/2009 | Salokatve | G02B 6/2835 385/43 |
| 2010/0142894 A1* | 6/2010 | Gonthier | G02B 6/2804 385/50 |
| 2013/0216184 A1* | 8/2013 | Kopp | G02B 6/30 385/43 |
| 2013/0243377 A1* | 9/2013 | Seo | G02B 6/2821 385/37 |
| 2014/0205236 A1 | 7/2014 | Noguchi et al. | |

FOREIGN PATENT DOCUMENTS

| | | |
|---|---|---|
| EP | 1 862 830 A2 | 12/2007 |
| EP | 2 746 827 A1 | 6/2014 |
| JP | 4-361204 A | 12/1992 |

(Continued)

OTHER PUBLICATIONS

Office Action dated Apr. 7, 2015, issued in coresponding Japanese Patent Application No. 2013-172179, with English translation (7 pages).

*Primary Examiner* — Kaveh C Kianni
*Assistant Examiner* — Hung Lam
(74) *Attorney, Agent, or Firm* — Westerman, Hattori, Daniels & Adrian, LLP

(57) ABSTRACT

An optical combiner includes a plurality of input optical fibers, an output optical fiber, and a bridge fiber optically coupled to the plurality of input optical fibers and the output optical fiber. The bridge fiber includes a tapered portion whose outer diameter is reduced toward the emission end, and the outer diameter of the emission end face of the bridge fiber is smaller than the cladding outer diameter of the incident end face of the output optical fiber.

10 Claims, 6 Drawing Sheets

(56) References Cited

FOREIGN PATENT DOCUMENTS

| JP | 2000-141073 A | 5/2000 |
| JP | 2008-10804 A | 1/2008 |
| JP | 2012-129426 A | 7/2012 |
| JP | 5089950 B2 | 12/2012 |
| JP | 5216151 B1 | 6/2013 |
| JP | 2015-34942 A | 2/2015 |
| WO | 2013/038761 A1 | 3/2013 |

* cited by examiner

OPTICAL COMBINER AND LASER DEVICE USING THE SAME

BACKGROUND OF THE INVENTION

The present invention relates to an optical combiner and a laser device using the same, which are preferable to the case of suppressing heat generation or ignition caused by return light.

Heretofore, for an optical combiner that combines light beams emitted from a plurality of laser light sources with a single optical fiber, Patent Document 1 described below is proposed, for example.

In the multiport coupler described in Patent Document 1, a signal fiber 5 in the center is integrated with a plurality of pump fibers 4 disposed around the signal fiber 5, and the diameter is reduced on the tip end side. An emitted-light confinement waveguide 7 is concentrically provided around a core 6 of the signal fiber 5 positioned in the center. The emitted-light confinement waveguide 7 has the outer diameter greater than the outer diameter of the core 6, and has the refractive index higher than the refractive index of the cladding 8 and smaller than the refractive index of the core 6.

The emitted-light confinement waveguide 7 confines return light leaking from the core of a cladding pump fiber 3 at the portion at which the cladding pump fiber 3 is connected to the end portion on the diameter reduced side, and suppresses the damage of a pumping light source caused by the return light.

[Patent Document 1] Japanese Patent No. 5089950

SUMMARY OF THE INVENTION

However, in the multiport coupler, in the case where return light enters the cladding of the cladding pump fiber 3, not the core of the cladding pump fiber 3, it is not enabled to confine the return light in the emitted-light confinement waveguide 7.

Because of this, it is assumed that the return light is passed through the multiport coupler, and emitted to the signal fiber 5, which is not integrated with the multiport coupler, to cause the coating layer of the signal fiber to generate heat for degrading reliability.

It is an object of the present invention to provide an optical combiner and a laser device using the same that can improve reliability.

According to an embodiment of the present invention, there is provided an optical combiner including: a plurality of input optical fibers; an output optical fiber; and a bridge fiber disposed between the plurality of input optical fibers and the output optical fiber and optically coupled to the plurality of input optical fibers and the output optical fiber, wherein the bridge fiber includes a tapered portion whose outer diameter is reduced toward an emission end of the bridge fiber, and an outer diameter of an emission end face of the bridge fiber is smaller than a cladding outer diameter of an incident end face of the output optical fiber.

In the optical combiner, the outer diameter of the emission end face of the bridge fiber is smaller than the cladding outer diameter of the incident end face of the output optical fiber. Therefore, even though light emitted from the output optical fiber is reflected off a workpiece, for example, and the light is passed through the emission end face of the output optical fiber and emitted from the incident end face as return light, most of the light is reflected off the outer circumferential surface of the tapered portion of the bridge fiber, and emitted to the outside.

Thus, it is greatly reduced that return light enters the bridge fiber, and that return light is passed through the bridge fiber and reaches the coating layer of the input optical fiber from the incident end face. Consequently, the optical combiner can suppress the heat generation or ignition of the bridge fiber or the coating layer of the input optical fiber caused by return light.

Accordingly, the improvement of reliability of the optical combiner is implemented.

Preferably, the bridge fiber is formed of a plurality of bridge fibers optically coupled to each other, and in adjacent bridge fibers at at least one location of the plurality of bridge fibers, an outer diameter of an incident end face of the bridge fiber located on the output optical fiber side is greater than an outer diameter of an emission end face of the bridge fiber located on the input optical fiber side.

In this case, light emitted to the outside of the optical combiner is distributed to the joining portion between the joining portion between the bridge fiber and the output optical fiber and the adjacent bridge fibers. Therefore, it is possible to suppress such an event that the light emitted to the outside is concentrated on a certain location in the outside as compared with the case where light is emitted to the outside only through the joining portion between the bridge fiber and the output optical fiber.

Accordingly, it is also possible to suppress the heat generation or ignition of the members around the optical fiber caused by return light.

Moreover, preferably, the plurality of bridge fibers individually includes a core and a cladding that surrounds an outer circumferential surface of the core, and a ratio of an outer diameter of the core to an outer diameter of the cladding in the plurality of bridge fibers is smaller in a bridge fiber located more apart from an input optical fiber.

In this configuration, the end face of the bridge fiber on the output optical fiber side is always increased at the fusion-spliced point between the bridge fibers as compared with the case where a single bridge fiber in which the ratio of the outer diameter of the core to the outer diameter of the cladding is the same along the longitudinal direction is used instead of the plurality of bridge fibers. Accordingly, it is possible that return light is more distributed and emitted to the outside.

Alternatively, preferably, in the plurality of bridge fibers, light is propagated entirely through a bridge fiber to which the plurality of input optical fibers is connected, and one or two or more of bridge fibers other than the bridge fiber include a core and a cladding that surrounds an outer circumferential surface of the core.

In this configuration, it is possible to reduce the diameter difference between the outer diameter of the incident end of the bridge fiber to which a plurality of the input optical fibers is connected and the outer diameter of the bundled input optical fibers as compared with the case where the bridge fiber to which a plurality of the input optical fibers is connected has the structure including the core and the cladding.

Accordingly, it is possible to reduce the concentration of stress at the fusion-spliced point between the input optical fibers and the bridge fiber, and it is possible to improve the strength at the fusion-spliced point between the input optical fibers and the bridge fiber.

Moreover, preferably, two or more of bridge fibers are included other than the bridge fiber to which the plurality of input optical fibers is connected, and a ratio of an outer diameter of the core to an outer diameter of the cladding in the two or more of bridge fibers is smaller in a bridge fiber located more apart from the input optical fiber.

In this configuration, the end face of the bridge fiber on the output optical fiber side is always increased at the fusion-spliced point between the bridge fibers as compared with the case where a single bridge fiber in which the ratio of the outer diameter of the core to the outer diameter of the cladding is the same is used instead of two or more of the bridge fibers. Accordingly, it is possible that return light is more distributed and emitted to the outside.

Moreover, preferably, a maximum outer diameter of a bridge fiber to which the output optical fiber is connected is smaller than a maximum outer diameter of other bridge fibers.

In this configuration, it is possible to reflect return light leaked from the emission-side bridge fiber off the outer circumferential surface of the tapered portion of the incident-side bridge fiber. Therefore, it is possible to easily keep the return light away from the input optical fiber, and as a result, it is possible to further suppress the absorption of return light to the coating layer of the input optical fiber.

Moreover, a laser device according to an aspect of the present invention is a laser device including: any of the optical combiners described above; and a laser light source configured to apply laser light to the input optical fiber.

This laser device includes the optical combiner that can improve reliability, as described above. Accordingly, it is possible to implement the improvement of reliability of the laser device.

As described above, according to an aspect of the present invention, it is possible to provide an optical combiner and a laser device using the same that can improve reliability.

DETAILED DESCRIPTION OF THE INVENTION

In the following, preferred embodiments according to the present invention will be described in detail with reference to the drawings.

(1) First Embodiment

Figure 1:
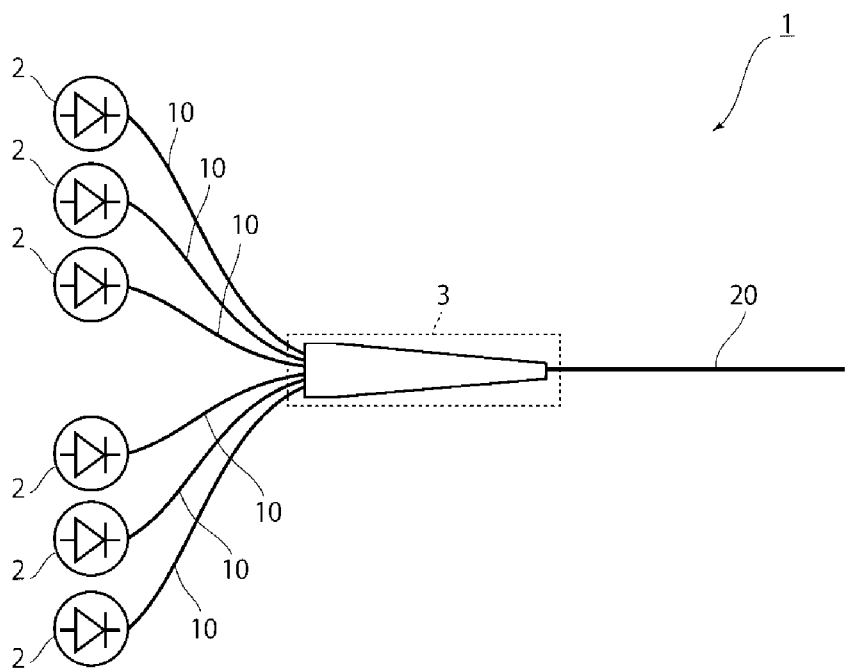
FIG. 1 is a diagram of a laser device according to a first embodiment.

FIG. 1 is a diagram of a laser device 1 according to a first embodiment. As illustrated in FIG. 1, the laser device 1 according to the embodiment includes a plurality of laser light sources 2 and an optical combiner 3 as main components.

The laser light source 2 emits laser light, which is a laser diode or a Fabry-Perot fiber laser and a fiber ring fiber laser, for example.

The optical combiner 3 includes a plurality of input optical fibers 10, an output optical fiber 20, and a bridge fiber 30 as main components.

Figure 2:
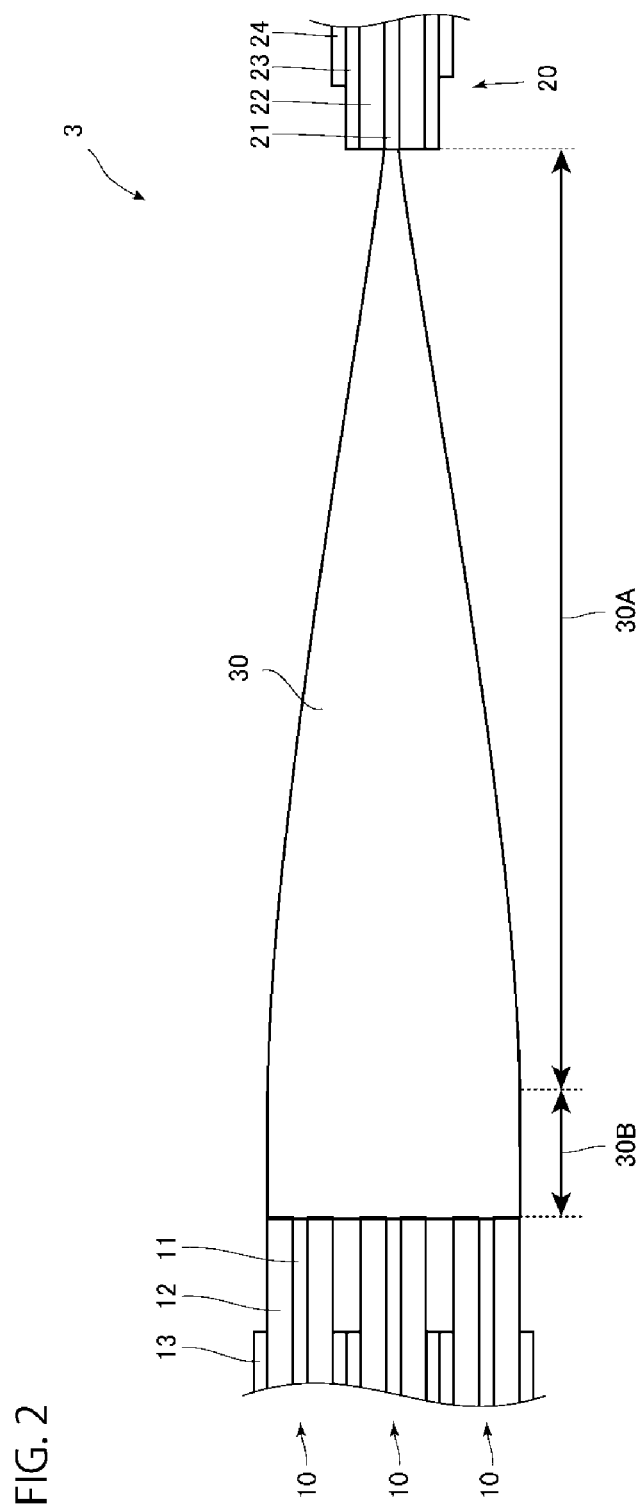
FIG. 2 is a diagram of the cross section of an optical combiner according to the first embodiment.

FIG. 2 is a diagram of the cross section of the optical combiner 3 according to the first embodiment. As illustrated in FIG. 2, the input optical fiber 10 is an optical fiber that causes laser light emitted from the laser light source 2 to enter the bridge fiber 30, and the input optical fibers 10 are provided in the same number as the number of the laser light sources. The input optical fibers 10 individually include a core 11, a cladding 12 that surrounds the outer circumferential surface of the core 11, and a coating layer 13 that covers the cladding 12.

The refractive index of the core 11 is set higher than the refractive index of the cladding 12. For example, the core 11 is made of pure quartz, and the cladding 12 is made of quartz doped with a dopant such as fluorine that reduces the refractive index.

The output optical fiber 20 is an optical fiber that causes laser light emitted from the bridge fiber 30 to emit in the subsequent stage. The output optical fiber 20 includes a core 21, a cladding 22 that surrounds the outer circumferential surface of the core 21, an outer cladding 23 that surrounds the outer circumferential surface of the cladding 22, and a coating layer 24 that covers the outer cladding 23.

The refractive index of the core 21 is set higher than the refractive index of the cladding 22, and the refractive index of the cladding 22 is set higher than the refractive index of the outer cladding 23. For example, the core 21 is made of silica doped with a dopant such as germanium that increases the refractive index, the cladding 22 is made of pure silica, and the outer cladding 23 is made of a polymer such as glass or a resin whose refractive index is lower than the refractive index of the cladding 22.

The bridge fiber 30 is a glass body provided between a plurality of the input optical fibers 10 and the output optical fiber 20 and optically coupled to a plurality of the input optical fibers 10 and the output optical fiber 20. The bridge fiber 30 does not have a core-cladding structure, and the entire bridge fiber 30 is a portion through which light is propagated.

The refractive index of the bridge fiber 30 is not limited more specifically. However, from the viewpoint of reducing the refraction of light incident from the input optical fiber 10, preferably, the refractive index of the bridge fiber 30 is substantially the same as the refractive index of the core 11 of the input optical fiber 10. For example, the first bridge fiber 30 is made of pure silica.

Moreover, the bridge fiber 30 includes a tapered portion 30A whose outer diameter is reduced toward the emission end of the bridge fiber 30. In the bridge fiber 30 according to the embodiment, the portion from a position in the midway point between the incident end and the emission end to the emission end is the tapered portion 30A, and the portion from the incident end to the position in the midway point is a constant diameter portion 30B whose outer diameter is constant along the length direction of the bridge fiber 30.

The tapered portion 30A is integrally formed with the constant diameter portion 30B, and the outer diameter of the large diameter end face of the tapered portion 30A is matched with the outer diameter of the constant diameter portion 30B. That is, the outer diameter of the incident end face of the bridge fiber 30 is matched with the outer diameter of the large diameter end face of the tapered portion 30A, and is the largest in the bridge fiber 30. On the other hand, the emission end face of the bridge fiber 30 is the small diameter end face of the tapered portion 30A, and the outer diameter of the emission end face is the smallest in the bridge fiber 30.

The outer diameter of the emission end face of the bridge fiber 30 is made smaller than the cladding outer diameter of the incident end face of the output optical fiber 20, and the emission end face is fusion-spliced to a part of the core 21 and the cladding 22 on the incident end face of the output optical fiber 20. On the other hand, the incident end face of the bridge fiber 30 is fusion-spliced to the core 11 and the cladding 12 on the emission end face of the individual input optical fibers 10.

It is noted that in the optical combiner 3 according to the embodiment, the coating layer 13 at one end portion fusion-spliced to the bridge fiber 30 is removed in the input optical fibers 10, and the cladding 12 of the portion is exposed. Moreover, the coating layer 24 at one end portion fusion-spliced to the bridge fiber 30 is removed in the output optical fiber 20, and the outer cladding 23 of the portion is exposed.

Next, the propagation of light in the optical combiner 3 will be described. In the case where laser light enters the bridge fiber 30 from the laser light source 2 through the input optical fiber 10, the laser light is propagated while spreading through the bridge fiber 30, and reaches the tapered portion 30A.

At the tapered portion 30A, the laser light is propagated while at least a part of the light is reflected off the outer circumferential surface of the bridge fiber 30. It is noted that an angle of the light reflected off the outer circumferential surface of the bridge fiber 30 is increased with respect to the axial direction of the bridge fiber 30.

The light propagated through the tapered portion 30A then enters the core 21 of the output optical fiber 20 from the emission end face of the bridge fiber 30, and the light is propagated through the core 21 and emitted from the emission end face of the output optical fiber 20 to the subsequent stage.

Figure 3:
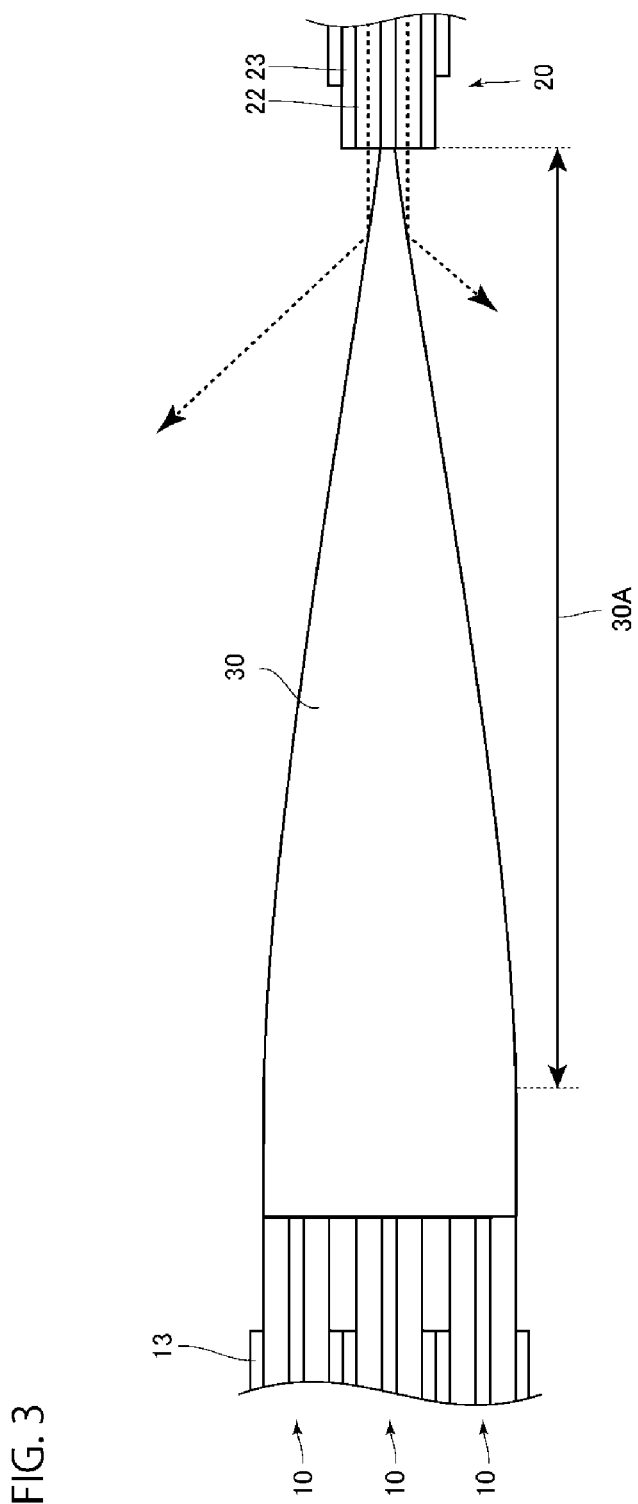
FIG. 3 is a schematic diagram of the propagation of return light in the optical combiner according to the first embodiment.

There is the case where light emitted from the output optical fiber 20 is reflected off a workpiece, for example, and the light enters the cladding 22 from the emission end face of the output optical fiber 20 as return light. The propagation of return light in this case will be described. FIG. 3 is a schematic diagram of the propagation of return light in the optical combiner 3 according to the first embodiment.

As illustrated in FIG. 3, since the cladding 22 of the output optical fiber 20 is covered with the outer cladding 23, the return light incident on the cladding 22 is propagated through the output optical fiber 20 from the emission end face to the incident end face of the output optical fiber 20. The return light is then emitted from the cladding 22 on the incident end face of the output optical fiber 20, and reaches the bridge fiber 30.

In the embodiment, the outer diameter of the emission end face of the bridge fiber 30 is smaller than the cladding outer diameter of the incident end face of the output optical fiber 20. Therefore, most of the light emitted from the incident end face of the output optical fiber 20 is reflected off the outer circumferential surface of the tapered portion 30A of the bridge fiber 30, and emitted to the outside.

Thus, in the optical combiner 3 according to the embodiment, it is greatly reduced that return light enters the bridge fiber 30, or that return light reaches the coating layer 13 of the input optical fiber 10 from the incident end face through the bridge fiber 30.

Consequently, the optical combiner 3 according to the embodiment can suppress the heat generation or ignition of the bridge fiber 30 or the coating layer 13 of the input optical fiber 10 caused by return light. Accordingly, the optical combiner 3 is provided, which can suppress heat generation or ignition caused by return light.

(2) Second Embodiment

Next, a second embodiment will be described in detail with reference to the drawings. However, in components according to the second embodiment, components the same as or equivalent to the components in the first embodiment are designated the same reference numerals and signs, and the overlapping description is appropriately omitted.

Figure 4:
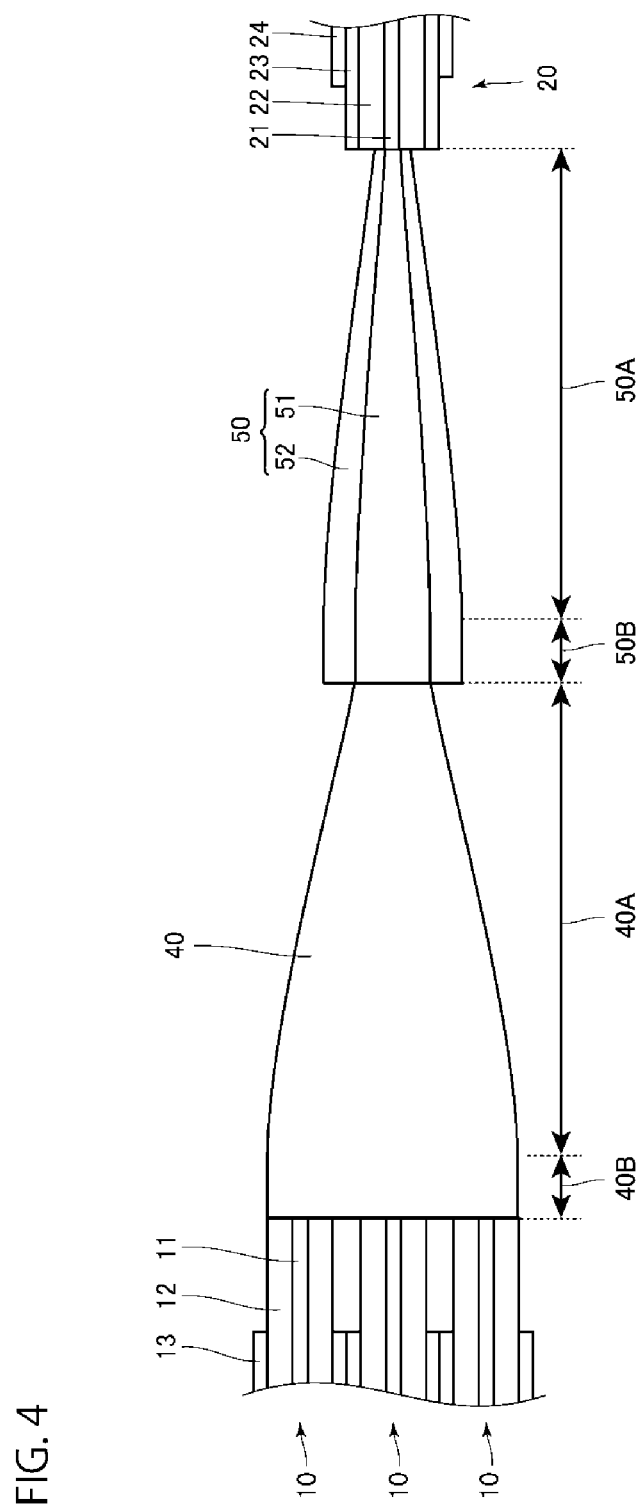
FIG. 4 is a diagram of an optical combiner according to a second embodiment.

FIG. 4 is a diagram of an optical combiner according to the second embodiment. As illustrated in FIG. 4, the optical combiner according to the embodiment is different from the first embodiment in that a bridge fiber is formed in a two-stage structure.

That is, the optical combiner according to the embodiment includes a first bridge fiber 40 and a second bridge fiber 50, instead of a single bridge fiber 30 according to the first embodiment.

The first bridge fiber 40 and the second bridge fiber 50 are disposed between a plurality of input optical fibers 10 and an output optical fiber 20, and are optically coupled to each other. Moreover, the first bridge fiber 40 in the previous stage located on the input optical fiber 10 side is optically coupled to the input optical fibers 10, and the second bridge fiber 50 in the subsequent stage located on the output optical fiber 20 side is optically coupled to the output optical fiber 20.

The first bridge fiber 40 does not have the core-cladding structure, and the entire bridge fiber 40 is a portion through which light is propagated.

The refractive index of the bridge fiber 40 is not limited more specifically. However, from the viewpoint of reducing the refraction of light incident from the input optical fiber 10, preferably, the refractive index is substantially the same as the refractive index of a core 11 of the input optical fiber 10.

Similarly to the bridge fiber 30 according to the first embodiment, the first bridge fiber 40 includes a tapered portion 40A whose outer diameter is reduced toward the emission end of the first bridge fiber 40 and a constant diameter portion 40B whose outer diameter is constant along the length direction of the first bridge fiber 40.

The outer diameter of the incident end face of the first bridge fiber 40 is matched with the outer diameter of the large diameter end face of the tapered portion 40A, and the incident end face is fusion-spliced to the core 11 and a cladding 12 on the emission end face of the input optical fibers 10.

The second bridge fiber 50 includes a core 51 and a cladding 52 that covers the core 51. That is, in the second bridge fiber 50, the core 51 that is a core layer of the second bridge fiber 50 is a portion through which light is propagated.

The refractive index of the core 51 is set higher than the refractive index of the cladding 52. For example, the core 51 is made of pure silica, and the cladding 52 is made of silica doped with a dopant such as fluorine that reduces the refractive index. It is noted that from the viewpoint of suppressing the refraction of light incident from the first bridge fiber 40, preferably, the refractive index of the core 51 is set substantially the same as the refractive index of the first bridge fiber 40. For example, the core 51 is made of pure silica.

Similarly to the bridge fiber 30 according to the first embodiment, the second bridge fiber 50 includes a tapered portion 50A whose outer diameter is reduced toward the emission end of the second bridge fiber 50 and a constant diameter portion 50B whose outer diameter is constant along the length direction of the first bridge fiber 40.

The outer diameter of the incident end face of the second bridge fiber 50 is matched with the outer diameter of the large diameter end face (the cladding outer diameter) of the tapered portion 50A, and the incident end face is fusion-spliced to the emission end face of the first bridge fiber 40 (the small diameter end face of the tapered portion 40A). On the other hand, the emission end face of the second bridge fiber 50 (the small diameter end face of the tapered portion 50A) is fusion-spliced to a part of a core 21 and a cladding 22 on the incident end face of the output optical fiber 20.

The outer diameter of the incident end face of the second bridge fiber 50 is set greater than the outer diameter of the emission end face of the first bridge fiber 40. Moreover, the maximum outer diameter of the second bridge fiber 50 is set smaller than the maximum outer diameter of the first bridge fiber 40.

It is noted that in the case of the embodiment, the outer diameter of the incident end face is at the maximum in the second bridge fiber 50, and the outer diameter of the incident end face is at the maximum in the first bridge fiber 40. Moreover, similarly to the case of the first embodiment, the outer diameter of the emission end face of the second bridge fiber 50 is set smaller than the cladding outer diameter of the incident end face of the output optical fiber 20.

Figure 5:
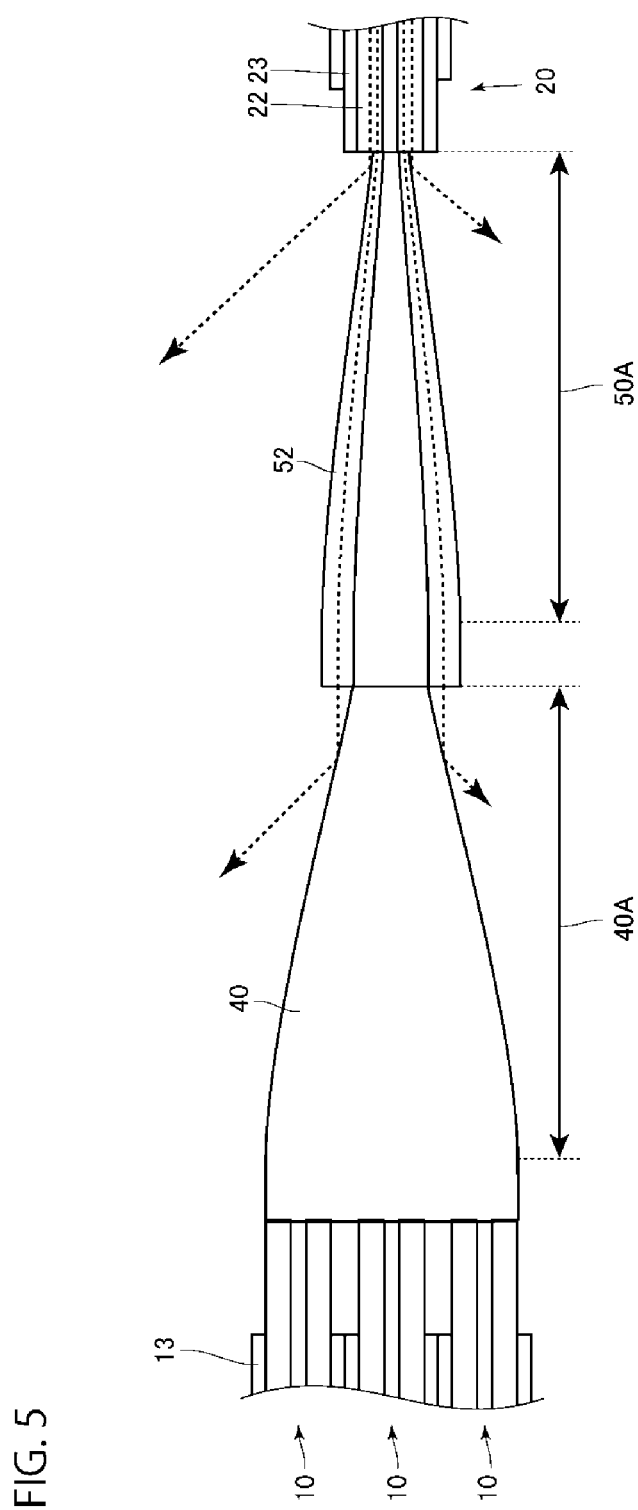
FIG. 5 is a schematic diagram of the propagation of return light in the optical combiner according to the second embodiment.

Next, the propagation of return light in an optical combiner 3 will be described. FIG. 5 is a schematic diagram of the propagation of return light in the optical combiner 3 according to the second embodiment.

As illustrated in FIG. 5, return light incident on the cladding 22 of the output optical fiber 20 is propagated through the output optical fiber 20 from the emission end face to the incident end face of the output optical fiber 20, and reaches the second bridge fiber 50.

In the embodiment, the outer diameter of the emission end face of the second bridge fiber 50 is smaller than the cladding outer diameter of the incident end face of the output optical fiber 20. Therefore, most of the light emitted from the incident end face of the output optical fiber 20 is reflected off the outer circumferential surface of the tapered portion 50A of the second bridge fiber 50 or enters the cladding 52 of the second bridge fiber 50.

In the case where the return light is reflected off the outer circumferential surface of the tapered portion 50A, the light is emitted to the outside. On the other hand, in the case where the return light enters the cladding 52, the light is propagated through the cladding 52, emitted from the incident end face of the second bridge fiber 50, and reaches the first bridge fiber 40.

In the embodiment, the outer diameter of the incident end face of the second bridge fiber 50 is smaller than the outer diameter of the emission end face of the first bridge fiber 40. Therefore, most of the light emitted from the cladding 52 on the incident end face of the second bridge fiber 50 is reflected off the outer circumferential surface of the tapered portion 40A of the first bridge fiber 40, and emitted to the outside.

Thus, in the embodiment, light emitted to the outside is distributed to the joining portion between the second bridge fiber 50 and the output optical fiber 20 and the joining portion between the first bridge fiber 40 and the second bridge fiber 50.

Therefore, the optical combiner according to the embodiment can suppress such an event that the light emitted to the outside is concentrated on a certain location in the outside as compared with the case of the first embodiment where light is emitted to the outside only through the joining portion between the bridge fiber 30 and the output optical fiber 20.

Accordingly, the optical combiner according to the embodiment can also suppress the heat generation or ignition of the members around the optical fiber caused by return light. It is noted that similarly to the case of the first embodiment, the optical combiner according to the embodiment can also suppress the heat generation or ignition of the first bridge fiber 40, the second bridge fiber 50, or the coating layer 13 of the input optical fiber 10.

Moreover, the optical combiner according to the embodiment has the structure in which the first bridge fiber 40, to which a plurality of the input optical fibers 10 is connected, does not include the core and the cladding. In this optical combiner, it is possible to reduce the diameter difference between the outer diameter of the incident end of the first bridge fiber 40 and the outer diameter of the bundled input optical fibers 10 as compared with the case where the first bridge fiber 40 is formed in the structure including the core and the cladding.

For example, the size of the outer diameter of the first bridge fiber 40, or the number of the input optical fibers 10 and the size of the outer diameter of the input optical fiber 10, for example, are adjusted, so that the outer diameter of the incident end of the first bridge fiber 40 to be coupled to the input optical fibers 10 can be made substantially equal to the outer diameter of the bundled input optical fibers 10.

Therefore, the concentration of stress at the fusion-spliced point between the input optical fibers 10 and the first bridge fiber 40 is reduced, and it is possible to improve the strength at the fusion-spliced point between the input optical fibers 10 and the first bridge fiber 40.

(3) Third Embodiment

Next, a third embodiment will be described in detail with reference to the drawing. However, in components according to the third embodiment, components the same as or equivalent to the components in the above embodiments are designated the same reference numerals and signs, and the overlapping description is appropriately omitted.

Figure 6:
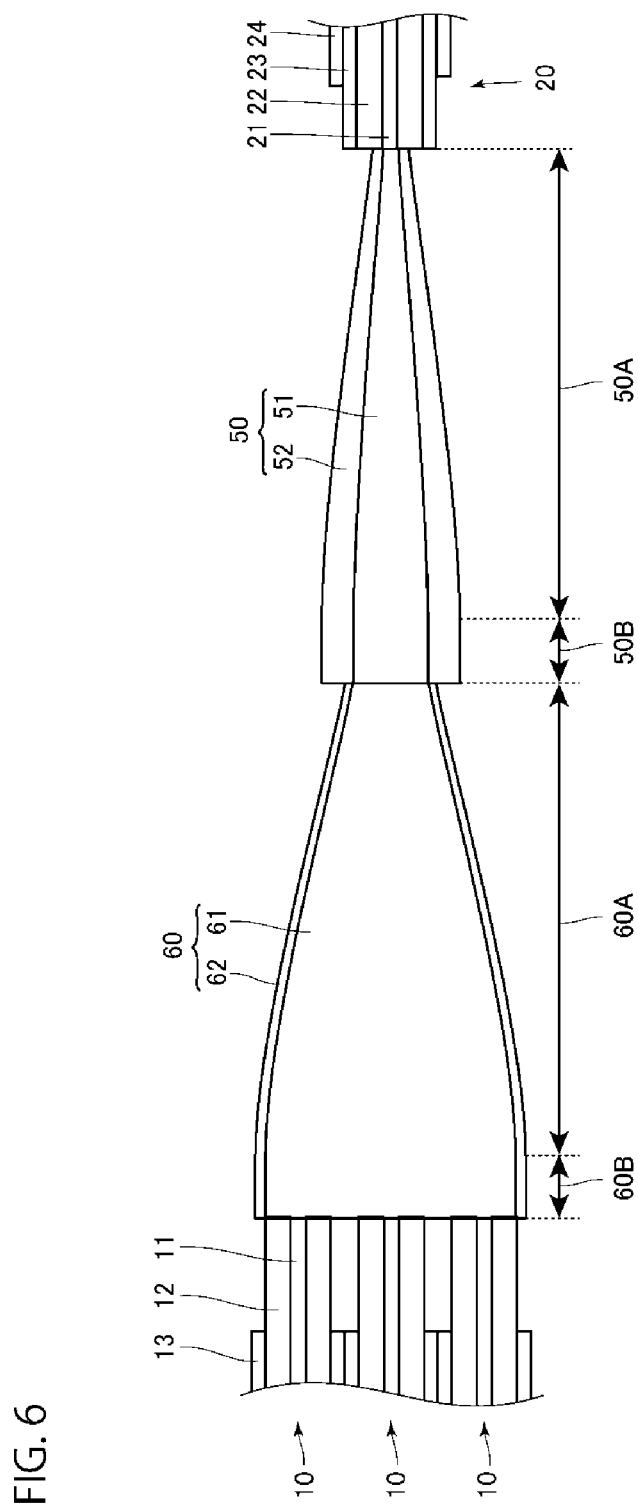
FIG. 6 is a diagram of an optical combiner according to a third embodiment.

FIG. 6 is a diagram of an optical combiner according to the third embodiment. As illustrated in FIG. 6, the optical combiner according to the embodiment is different from the second embodiment in that bridge fibers in two stages are formed in a core-cladding structure.

That is, the optical combiner according to the embodiment includes a first bridge fiber 60 having a core 61 and a cladding 62 that surrounds the outer circumferential surface of the core 61 instead of the first bridge fiber 40 according to the second embodiment.

Similarly to the first bridge fiber 40 according to the second embodiment, the first bridge fiber 60 includes a tapered portion 60A whose outer diameter is reduced toward the emission end and a constant diameter portion 60B whose outer diameter is constant along the length direction of the first bridge fiber 60.

The outer diameter of the incident end face of the first bridge fiber 60 is matched with the outer diameter (the cladding outer diameter) of the large diameter end face of the tapered portion 60A, and the core 61 on the incident end face is fusion-spliced to a core 11 and a cladding 12 on the emission end face of input optical fibers 10.

It is noted that similarly to the second embodiment, the outer diameter of the incident end face of the second bridge fiber 50 is set greater than the outer diameter of the emission end face of the first bridge fiber 60. Moreover, similarly to the second embodiment, the maximum outer diameter of the second bridge fiber 50 is set smaller than the maximum outer diameter of the first bridge fiber 40.

In the case of the embodiment, the ratio of the outer diameter of the core 61 of the first bridge fiber 60 to the outer diameter of the cladding 62 is greater than the ratio of the outer diameter of the core 51 of the second bridge fiber 50 to the outer diameter of the cladding 52. That is, the ratio of the outer diameter of the core to the outer diameter of the cladding is smaller in the bridge fiber located more apart from the input optical fiber 10. It is noted that the ratio of the outer diameter of the core to the outer diameter of the cladding is A/B, where the outer diameter of the core is A and the outer diameter of the cladding is B.

In this optical combiner, the end face of the second bridge fiber 50 on the output optical fiber side is increased at the fusion-spliced point between the bridge fibers as compared with the case where a single bridge fiber in which the ratio of the outer diameter of the core to the outer diameter of the cladding is the same along the longitudinal direction is used instead of the first bridge fiber 60 and the second bridge fiber 50. Therefore, it is possible that return light is more distributed and emitted to the outside.

(4) Exemplary Modifications

Hereinabove, the embodiments are described as examples. However, the present invention is not limited to the embodiments.

For example, in the first embodiment to the third embodiment, the bridge fiber configured of the tapered portion and the constant diameter portion is applied. However, such a bridge fiber may be applied that the constant diameter portion is omitted.

In the second embodiment, the first bridge fiber 40 located closest to the input optical fiber is a bridge fiber through which light is propagated entirely (a bridge fiber has no core-cladding structure). Moreover, a bridge fiber other than the first bridge fiber 40 is a single second bridge fiber 50 including the core 51 and the cladding 52.

However, two or more of the second bridge fibers 50 may be provided between the first bridge fiber 40 and the output optical fiber 20 as bridge fibers other than the first bridge fiber 40. In the case where two or more of the second bridge fibers 50 are provided between the first bridge fiber 40 and the output optical fiber 20 as described above, preferably, the ratio of the core to the cladding in these second bridge fibers 50 is made similar to the ratio in the third embodiment.

That is, such a bridge fiber is preferable that the ratio of the outer diameter of the core 51 to the outer diameter of the cladding 52 in two or more of the second bridge fibers 50 is smaller in the bridge fiber located more apart from the input optical fiber 10.

With this configuration, the end face of the second bridge fiber 50 on the output optical fiber side is increased at the fusion-spliced point between the bridge fibers as compared with the case where a single second bridge fiber 50 is provided. Therefore, it is possible that return light is more distributed and emitted to the outside.

Furthermore, in the case where two or more of the second bridge fibers 50 are provided between the first bridge fiber 40 and the output optical fiber 20, preferably, the maximum outer diameter of the bridge fiber to which the output optical fiber is connected is smaller than the maximum outer diameter of the other bridge fibers, similarly to the second embodiment and the third embodiment.

In the third embodiment, two bridge fibers including the core and the cladding are provided between the input optical fiber 10 and the output optical fiber 20. However, three bridge fibers or more may be provided as long as the ratio of the outer diameter of the core to the outer diameter of the cladding in the bridge fibers is smaller in the bridge fiber located more apart from the input optical fiber 10.

It is noted that in the case where three bridge fibers or more are provided, preferably, the maximum outer diameter of the bridge fiber to which the output optical fiber is connected is smaller than the maximum outer diameter of the other bridge fibers, similarly to the second embodiment and the third embodiment.

Moreover, in the embodiments, the components of the laser light source 2 are not illustrated more specifically. However, various components may be included as long as the components emit laser light.

Furthermore, in the embodiments, the laser device 1 is applied including a plurality of the laser light sources 2 and the optical combiner 3 as components. For example, a resonant fiber laser device, or an MO-PA (Master Oscillator Power Amplifier) fiber laser device may be applied, and the other laser devices may be applied.

It is noted that the components of the laser device 1 and the optical combiner 3 can be appropriately combined, omitted, modified, and added with known techniques within the scope not deviating from the object of the present application, other than the content described in the embodiments or the exemplary modifications.

The present invention is usable in various fields using optical fiber combiners such as in processing fields and medical fields using laser devices.

The invention claimed is:

1. An optical combiner comprising:
   a plurality of input optical fibers;
   an output optical fiber; and
   a bridge fiber disposed between the plurality of input optical fibers and the output optical fiber and optically coupled to the plurality of input optical fibers and the output optical fiber, wherein
   the bridge fiber includes an input end face coupled to the plurality of input optical fibers, and an emission end face opposite to the input end face and coupled to the output optical fiber,
   the bridge fiber includes a tapered portion whose outer diameter is reduced toward the emission end face of the bridge fiber,
   the output optical fiber includes an incident end face connected to the emission end face of the bridge fiber, and
   an outer diameter of the emission end face of the bridge fiber is smaller than a cladding outer diameter of the incident end face of the output optical fiber such that the boundary between the bridge fiber and the output optical fiber includes a step projecting radially,
   wherein
   the bridge fiber includes a plurality of bridge fibers optically coupled to each other, the plurality of bridge fibers including a first bridge fiber and a second bridge fiber disposed next to each other in an axial direction of the bridge fiber,
   the first bridge fiber includes a first input end face coupled to the plurality of input optical fibers, and a first emission end face opposite to the first input end face,
   the second bridge fiber includes a second input end face coupled to the first emission end face of the first bridge fiber, and a second emission end face opposite to the second input end face and coupled to the output optical fiber, and
   an outer diameter of the second input end face of the second bridge fiber is larger than an outer diameter of the first emission end face of the first bridge fiber such that the boundary between the first bridge fiber and the second bridge fiber includes a step projecting radially.

2. The optical combiner according to claim 1, wherein
   the plurality of bridge fibers individually includes a core and a cladding that surrounds an outer circumferential surface of the core, and a ratio of an outer diameter of the core to an outer diameter of the cladding in the plurality of bridge fibers is smaller in a bridge fiber located more apart from an input optical fiber.

3. The optical combiner according to claim 1, wherein in the plurality of bridge fibers, light is propagated entirely through the first bridge fiber, and one or two or more of bridge fibers other than the first bridge fiber include a core and a cladding that surrounds an outer circumferential surface of the core.

4. The optical combiner according to claim 3, wherein two or more of bridge fibers are included other than the first bridge fiber, and a ratio of an outer diameter of the core to an outer diameter of the cladding in the two or more of bridge fibers is smaller in a bridge fiber located more apart from the input optical fiber.

5. The optical combiner according to claim 1, wherein a maximum outer diameter of a bridge fiber to which the output optical fiber is connected is smaller than a maximum outer diameter of other bridge fibers.

6. A laser device comprising:
the optical combiner according to claim 1; and
a laser light source configured to apply laser light to the input optical fiber.

7. A laser device comprising:
the optical combiner according to claim 2; and
a laser light source configured to apply laser light to the input optical fiber.

8. A laser device comprising:
the optical combiner according to claim 3; and
a laser light source configured to apply laser light to the input optical fiber.

9. A laser device comprising:
the optical combiner according to claim 4; and
a laser light source configured to apply laser light to the input optical fiber.

10. A laser device comprising:
the optical combiner according to claim 5; and
a laser light source configured to apply laser light to the input optical fiber.

* * * * *